United States Patent
Booss et al.

(10) Patent No.: US 10,162,716 B2
(45) Date of Patent: Dec. 25, 2018

(54) HYBRID SCM-DRAM TRANSACTIONAL STORAGE ENGINE FOR FAST DATA RECOVERY

(71) Applicants: Daniel Booss, Wiesloch (DE); Peter Bumbulis, Cambridge (CA); Wolfgang Lehner, Dresden (DE); Ismail Oukid, Dresden (DE); Thomas Willhalm, Sandhausen (DE)

(72) Inventors: Daniel Booss, Wiesloch (DE); Peter Bumbulis, Cambridge (CA); Wolfgang Lehner, Dresden (DE); Ismail Oukid, Dresden (DE); Thomas Willhalm, Sandhausen (DE)

(73) Assignee: SAP SE, Walldorf (DE)

( * ) Notice: Subject to any disclaimer, the term of this patent is extended or adjusted under 35 U.S.C. 154(b) by 795 days.

(21) Appl. No.: 14/555,419

(22) Filed: Nov. 26, 2014

(65) Prior Publication Data
US 2015/0355981 A1    Dec. 10, 2015

Related U.S. Application Data

(60) Provisional application No. 62/009,808, filed on Jun. 9, 2014.

(51) Int. Cl.
*G06F 17/30* (2006.01)
*G06F 11/14* (2006.01)

(52) U.S. Cl.
CPC .... *G06F 11/1474* (2013.01); *G06F 17/30289* (2013.01); *G06F 17/30501* (2013.01); *G06F 2201/80* (2013.01); *G06F 2201/87* (2013.01)

(58) Field of Classification Search
CPC .......... G06F 2201/80; G06F 17/30289; G06F 2201/87; G06F 11/1474; G06F 17/30501
See application file for complete search history.

(56) References Cited

U.S. PATENT DOCUMENTS

| 5,781,910 A | * | 7/1998 | Gostanian | ......... G06F 17/30348 707/610 |
| 5,931,955 A | * | 8/1999 | Kung | .................. G06F 11/1471 707/999.202 |

(Continued)

OTHER PUBLICATIONS (Intel), Vish Viswanathan. "Intel® Memory Latency Checker v3.4." Intel® Software. Intel, Jul. 28, 2017. Web. <https://software.intel.com/en-us/articles/intelr-memory-latency-checker>.

(Continued)

*Primary Examiner* — Shiow-Jy Fan
(74) *Attorney, Agent, or Firm* — Mintz Levin Cohn Ferris Glovsky and Popeo, P.C.

(57) ABSTRACT

A data recovery system and method are disclosed. Primary data is stored a database in byte-addressable NVRAM, where the database includes one or more persistent tables of data in a byte-addressable, RAM format, and a persistent memory allocator that maps persistent memory pointers of the persistent memory to virtual memory pointers of a virtual memory associated with the database. Secondary data is stored in volatile DRAM. A failure recovery includes recovering the persistent memory allocator, mapping the persistent memory to the virtual memory to recover primary data using their persistent memory pointers, translating the persistent memory pointers to virtual memory pointers, undoing changes to the primary data made by unfinished transactions of the query execution at the time of failure of one of the one or more queries, and reconstructing the secondary data from the primary data.

16 Claims, 9 Drawing Sheets

(56) References Cited

U.S. PATENT DOCUMENTS

| | | | | |
|---|---|---|---|---|
| 2002/0103814 A1* | 8/2002 | Duvillier | ............ | G06F 17/30356 |
| 2002/0103819 A1* | 8/2002 | Duvillier | ............ | G06F 17/30356 |
| 2005/0120080 A1* | 6/2005 | Weinreb | ................ | G06F 9/4435 |
| | | | | 709/203 |
| 2005/0203974 A1* | 9/2005 | Smith | ................ | G06F 17/30359 |
| 2012/0254120 A1* | 10/2012 | Fang | ................. | G06F 17/30377 |
| | | | | 707/648 |
| 2013/0290283 A1* | 10/2013 | Fang | ................. | G06F 17/30377 |
| | | | | 707/696 |
| 2015/0243335 A1* | 8/2015 | Naeimi | ............... | G11C 11/1675 |
| | | | | 365/158 |

OTHER PUBLICATIONS

Bailey, Katelin A., et al. "Exploring storage class memory with key value stores." Proceedings of the 1st Workshop on Interactions of NVM/FLASH with Operating Systems and Workloads. ACM, 2013.

Chen, S, et al., "Rethinking Database Algorithms for Phase Change Memory," *CIDR*, 2011.

Coburn, Joel, et al. "NV-Heaps: making persistent objects fast and safe with next-generation, non-volatile memories." ACM Sigplan Notices 46.3 (2011): 105-118.

Condit, Jeremy, et al. "Better I/O through byte-addressable, persistent memory." Proceedings of the ACM SIGOPS 22nd symposium on Operating systems principles. ACM, 2009.

Dong, Xiangyu, et al. "Circuit and microarchitecture evaluation of 3D stacking magnetic RAM (MRAM) as a universal memory replacement." Design Automation Conference, 2008. DAC 2008.

Dulloor, Subramanya R., et al. "System software for persistent memory." Proceedings of the Ninth European Conference on Computer Systems. ACM, 2014.

Fang, Ru, et al. "High performance database logging using storage class memory." Data Engineering (ICDE), 2011 IEEE 27th International Conference on. IEEE, 2011.

Hosomi, M., et al. "A novel nonvolatile memory with spin torque transfer magnetization switching: Spin-RAM." Electron Devices Meeting, 2005. IEDM Technical Digest, 2005.

Intel®, "Intel® Architecture Instruction Set Extensions Programming Reference," Intel Ref. #319433-029, Apr. 2017.

Johnson, Ryan, et al. "Shore-MT: a scalable storage manager for the multicore era." Proceedings of the 12th International Conference on Extending Database Technology: Advances in Database Technology, 2009.

Kung, HT, and John T. Robinson. "On Optimistic Methods for Concurrency Control." ACM Transactions on Database Systems 6.2 (1981): 213-226.

Larson, Per-Åke, et al. "High-Performance Concurrency Control Mechanisms for Main-Memory Databases." arXiv preprint arXiv:1201.0228 (2011).

Lee, Benjamin C., et al. "Architecting phase change memory as a scalable dram alternative." ACM SIGARCH Computer Architecture News. vol. 37. No. 3. ACM, 2009.

Lee, Benjamin C., et al. "Phase-change technology and the future of main memory." IEEE micro 30.1 (2010).

Lee, Sang-Won, et al. "Accelerating In-p. Logging with Non-Volatile Memory." IEEE Data Eng. Bull. 33.4 (2010): 41-47.

Narayanan, Dushyanth, and Orion Hodson. "Whole-system persistence." ACM SIGARCH Computer Architecture News 40.1 (2012): 401-410.

Pandis, Ippokratis, et al. "Data-oriented transaction execution." Proceedings of the VLDB Endowment 3.1-2 (2010).

Pelley, Steven, et al. "Storage management in the NVRAM era." Proceedings of the VLDB Endowment 7.2 (2013): 121-132.

Qureshi, Moinuddin K., et al., "Scalable high performance main memory system using phase-change memory technology." ISCA, 2009.

R. Colledge. *SQL Server 2008 administration in action*. Manning, Greenwich, CT, 2010.

TATP, "Telecommunication Application Transaction Processing (TATP) Benchmark Description," IBM Software Group Information Management, Version 1.0, Mar. 27, 2009.

Venkataraman, Shivaram, et al. "Consistent and Durable Data Structures for Non-Volatile Byte-Addressable Memory." FAST. vol. 11. 2011.

Volos, H., et al., "Mnemosyne: Lightweight persistent memory." ACM SIGARCH Computer Architecture News. vol. 39. No. 1. ACM, 2011.

Williams, R. Stanley. "How we found the missing memristor." IEEE spectrum 45.12 (2008).

Zhao, Jishen, et al. "Kiln: Closing the performance gap between systems with and without persistence support." Microarchitecture (MICRO), 2013 46th Annual IEEE/ACM International Symposium on. IEEE, 2013.

* cited by examiner

```
Struct PMPtr {
    int64_t    m_BaseID;  ──▶ Persistent memory page ID
    ptrdiff_t  m_Offset;  ──▶ Offset indicating the start
}                             of the allocated block
```

SOFORT Recovery. TATP throughput with 4 users. The database is crashed at second 15.

FIG. 8

Table 1: Breakdown of SOFORT's Restart Time. DB Size = 100M rows. Dict Size = 10M entries/column.

| Configuration | Dict. Indexes Rebuild. | Rest of Recov. |
|---|---|---|
| SOFORT – HashMAP | 1848ms | 74ms |
| SOFORT – SkipList | 7599ms | 58ms |

FIG. 9

Algorithm 1 Update(TableName,Key,NewRow)

1: // Get table pointer from table name
2: ptab = find(TableName)
3:
4: // Get RowID from key value
5: DeleteIdx = ptab   getLatestVisible(Key)
6:
7: // Reserve a row and get back it index
8: InserIdx = ptab   ReserveRow()
9:
10: // Update the transaction object with InsertIdx and DeleteIdx
11: UpdateTransactionFlush(DeleteIdx, InsertIdx)
12:
13: // Try lo lock the row
14: if !AtomicLock(MVCCArray[DeleteIdx]) then
15:    Abort
16: end if
17: // Persistently insert new row
18: ptab→pushBackFlush(InsertIdx, NewRow)
19:
20: // Commit by updating the two MVCC entries
21: CommitUpdate(DeleteIdx, InsertIdx)
22: Flush MVCCArray[DeleteIdx]
23: Flush MVCCArray[InsertIdx]

FIG. 10

A.1 Insert

Algorithm 2 InsertRow(TableName, NewRow)

1: // Get table pointer from table name
2: ptab = find(TableName)
3:
4: // Reserve a row and get back its index
5: InsertIdx = ptab ReserveRow()
6:
7: // Persistently insert row and get back
8: ptab pushBackFlush(InsertIdx,NewRow)
9:
10: // Commit by updating the CTS
11: CommitInsert(InsertIdx)
12: Flush MVCCArray[InsertIdx]

FIG. 11

A.2 Delete

Algorithm 3 Delete(TableName, Key )

1: // Get table pointer from table name
2: ptab = find(TableName)
3:
4: // Get RowID from key value
5: DeleteIdx = ptab getLatestVisible(Key)
6:
7: // Try to lock and commit the row
8: if !AtomicTryLockCommit(MVCCArray[DeleteIdx]) then
9:     Abort
10: end if
11: // Flush updated MVCC
12: Flush MVCCArray[DeleteIdx]

FIG. 12

HYBRID SCM-DRAM TRANSACTIONAL STORAGE ENGINE FOR FAST DATA RECOVERY

CROSS REFERENCE TO RELATED APPLICATIONS

This application claims the benefit of priority of U.S. Provisional Patent Application No. 62/009,808, filed Jun. 9, 2014, entitled "Main Memory Transactional Storage Engine", which is incorporated herein by reference in their entirety.

TECHNICAL FIELD

The subject matter described herein relates to storage class memory, transactional main memory databases, and data recovery procedures, and in particular a hybrid SCM-DRAM transactional storage engine for fast data recovery.

BACKGROUND

Availability guarantees form an important part of many service level agreements (SLAs) for production database systems: minimizing database downtime has economic as well as usability benefits. Database systems can crash for a variety of reasons, including software bugs, hardware faults and user errors. Many of these conditions are transient, and for these, restarting after logging the error is a reasonable approach to recovery. In these cases, database restart time has a significant and direct impact on database availability.

In-memory database management systems (DBMSs) recover by rebuilding dynamic random access memory (DRAM) based data structures from a consistent state persisted on durable media. The persisted state typically consists of a copy ("checkpoint") of the database state at a particular instant in time, and a log of any subsequent updates. Recovery consists of reloading portions of the checkpointed state, applying subsequent updates and then undoing the effects of unfinished transactions. Database restart time not only includes the time to recover the consistent state as it existed before the crash, but also the time to reload any data required by the current workload. This second component can be substantial for OLAP workloads.

What is needed is a form of non-volatile memory that has high database performance of throughput and response time, while also providing improved restart performance, which is a shortcoming of traditional main memory database systems.

SUMMARY

This document describes the use of a non-volatile random access memory (NVRAM) for primary storage of database content. NVRAM is a form of Storage Class Memory (SCM), which can significantly improve database performance of throughput and response time. Use of NVRAM for primary storage can also significantly improve restart performance, a shortcoming of traditional main memory database systems. In one aspect, a hybrid SCM-DRAM storage engine is presented, which includes a main-memory transactional storage engine (MMTSE) that leverages full capabilities of SCM by doing away with a traditional log and updating the persisted data in place in small increments. The MMTSE can achieve restart times of a few seconds independent of instance size and transaction volume without significantly impacting transaction throughput.

In some aspects, a data recovery system and method are described. Primary data is stored a database in byte-addressable NVRAM, where the database includes one or more persistent tables of data in a byte-addressable, RAM format, and a persistent memory allocator that maps persistent memory pointers of the persistent memory to virtual memory pointers of a virtual memory associated with the database. Secondary data is stored in volatile DRAM. A failure recovery includes recovering the persistent memory allocator, mapping the persistent memory to the virtual memory to recover primary data using their persistent memory pointers, translating the persistent memory pointers to virtual memory pointers, undoing changes to the primary data made by unfinished transactions of the query execution at the time of failure of one of the one or more queries, and reconstructing the secondary data from the primary data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the above and potentially other issues with currently available solutions, methods, systems, articles of manufacture, and the like consistent with one or more implementations of the current subject matter can, among other possible advantages, provide a hybrid SCM-DRAM storage engine that speeds up restarts by taking advantage of the properties of SCM to operate on the persisted data directly without having to first cache it in DRAM. SCM includes a non-volatile memory (NVM) with latency characteristics close to that of DRAM, and a density, durability and economic characteristics comparable to existing storage media. Examples of SCM are phase change memory, spin transfer torque RAM, magnetic RAM, and memristors MMTSE can also speed up recovery by doing away with a traditional log and updating the persisted data in place in small increments. For example, with accepted assumptions for SCM performance, MMTSE can achieve this without compromising transactional throughput. To do so, a novel programming model can be used for persistent memory. Some structures can be put on SCM and some can be kept in DRAM. This flexibility can enable performance/restart time trade-offs since DRAM is faster than SCM and the structures that are not persisted in real time on SCM can be rebuilt at restart time. To build MMTSE, one or more persistent, single-level, lock-free, and concurrent data structures that are self-sufficient to recover in a consistent way relative to the state of the database can be used.

MMTSE is a main-memory transactional storage engine for mixed online analytical processing (OLAP) and online transactional processing (OLTP) workloads. To achieve good OLAP performance, tables can be stored column-wise. While MMTSE can be implemented as a column store, the same principles can also apply for row stores. As in other column-stores, such as SAP HANA, data can be split into a larger read-optimized, read-only main storage and a smaller write-optimized, read-write delta storage, with periodic merges from delta storage to main storage to keep the size of the delta storage bounded. The delta storage can be implemented in MMTSE, as the main storage is read-only.

Figure 1:
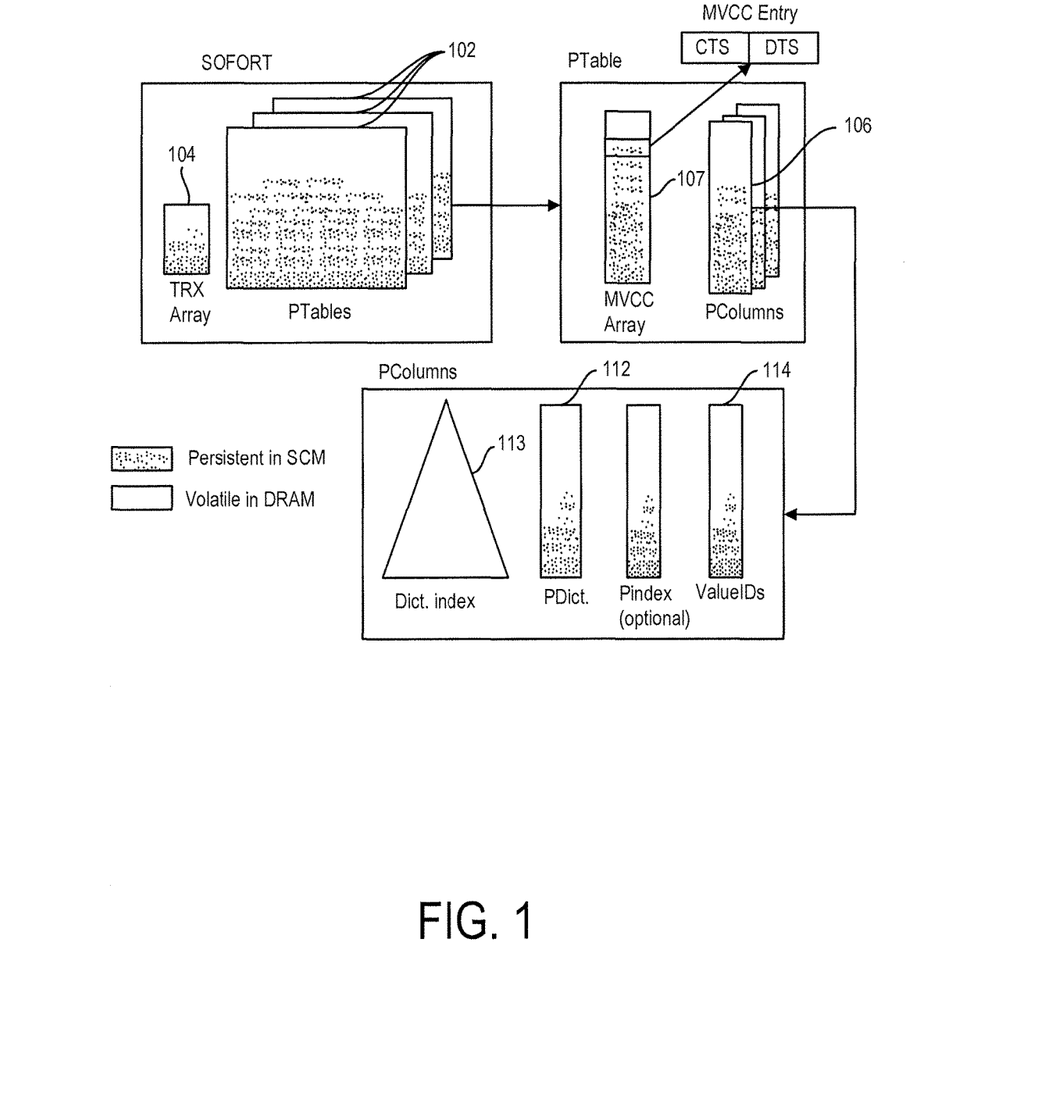
FIG. 1 is a diagram illustrating aspects of a MMTSE in accordance with implementations described herein.

In some implementations consistent with this disclosure, the MMTSE uses Multi-Version Concurrency Control (MVCC) and dictionary encoding. In particular, every column can have its own dictionary. Dictionary codes are integers called ValueIDs. FIG. 1 shows an implementation of an MMTSE system 100. An instance of MMTSE consists of multiple persistent tables (PTables) 102 and a persistent array of currently running transaction objects (TRX array) 104. In some implementations, the size of the TRX array 104 is fixed and bounds the maximum number of concurrent transactions. A transaction object can hold information related to the state of the transaction including a transaction time-stamp (TTS). A transaction ID (TXID) can be the index of a transaction in the TRX array. Each PTable encompasses several persistent columns (PColumns) 106 and a persistent MVCC array 107.

There can be one MVCC entry per row of a table. An MVCC entry consists of a commit time-stamp (CTS) 108 and a deletion time-stamp (DTS) 110, which are both initialized to GO. Time-stamps are logical and generated starting from sizeof (TRX array) by a global counter. When a transaction starts, it is assigned a transaction time stamp (TTS), which can be equal to the current logical time. The time-stamp counter can be incremented for every commit A CTS or DTS can be interpreted as a TXID if it is lower than or equal to the size of the TRX array. Based on its MVCC entry and relative to a transaction, a row can be:

Visible, if the TTS is greater than or equal to the CTS and lower than the DTS. If the DTS is a transaction ID (TXID), then it can be compared with the commit time-stamp of the transaction pointed to by that TXID.

Invisible, if it is not visible.

Locked, if its DTS is a TXID.

A PColumn 106 can be append-only and contain a persistent dictionary array (PDict.) 112 that maps ValueIDs 114 to Values, supported by a dictionary index 113 that maps Values to ValueIDs 114. Since not all data structures need to be persistent, it can be carefully chosen which ones to put on SCM and which ones are kept on DRAM. In general, column structures can be more bandwidth-bound while tree structures can be more latency-bound. Since the dictionary index can be heavily accessed and latency-bound, it can be kept on DRAM for better performance Hence, it can be necessary to reconstruct it from the dictionary array at restart time. All the other data structures are persistent in SCM.

Figure 2:
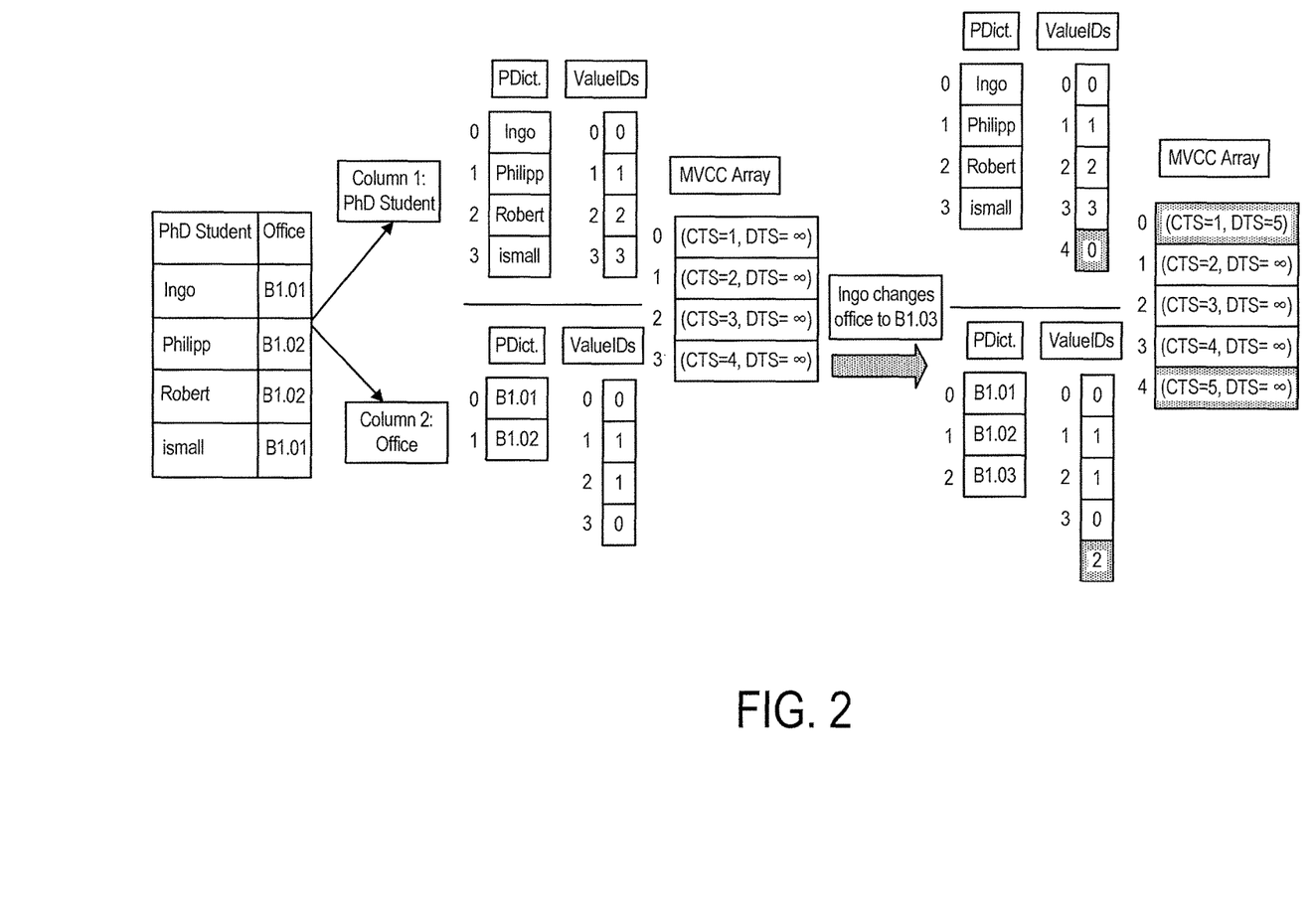
FIG. 2 is a diagram illustrating aspects of a MMTSE PTable.

FIG. 2 is an example of a MMTSE table of employees and their offices and illustrates how multiple versions can be managed. When a row is updated (in the example, Ingo changes office), the current version of the row can be invalidated by updating the DTS of the corresponding MVCC entry, and a new version of the row can be created, with its corresponding CTS equal to the DTS of the deleted row.

MMTSE can be latch-free and use atomic instructions only, except when resizing tables, where only writers are blocked. All data structures are concurrent and no centralized lock is needed. This makes MMTSE highly scalable to the number of cores and resilient to user contention. MMTSE can support only statement level isolation.

Programming Model

In some implementations of a programming model, like DRAM, writes to SCM can be cached. Executing a store instruction is not sufficient to guarantee that the data will reach SCM. As a consequence, persistent writes may need to be explicitly enforced. To achieve this, especially on x86 architectures, CPU flushing instructions and non-temporal stores can be used. The persistence primitives that are used can include:

CLFLUSH: a flushing instruction that invalidates the cache line that contains a given linear address. It writes back this cache line if it is inconsistent with memory.

MOVNT: a store instruction which bypasses the cache and writes directly to memory, as modern CPUs implement complex out-of-order execution, where for example, a flushing instruction can be reordered with previous instructions, leading to the eviction of a cache line that may not take into account the new writes that should have happened before the flushing instruction. To order memory instructions, memory barriers or fencing can be used.

The following fencing operators can be used to achieve a consistent and correct image of the database transaction within the NVRAM, which can also yield an instant recovery in case of a database crash:

SFENCE: Performs a serializing operation on all store-to-memory instructions that were issued prior to this instruction.

MFENCE: Performs a serializing operation on all memory instructions (load and store) that were issued prior to this instruction. For example, let persistentInt be a persistent integer variable, where it can be desired to persistently write 1 to this variable. To do so, the following sequence of instructions can be executed:

persistentInt=1;
MFENCE( );
CLFLUSH(&persistentInt);
MFENCE( );

The first memory barrier guarantees that value 1 has effectively been written to persistentInt and that the following flushing instruction will write back the new value of persistentInt. The cache line flushing instruction invalidates the cache line where persistentInt is held and writes it back to its location in SCM. This implies that persistent variables must not be split between two cache lines. The last memory barrier ensures that the cache line flushing instruction is not reordered with the next instructions. This can be required to order persistent write operations. For example, the suffix "Flush" can be used to indicate a persistent write operation.

Memory controllers on modern hardware have write buffers that can hold a write even after it has been flushed. To overcome this issue, the memory controller may need to drain its buffers on power failures, or CPUs need to implement a new primitive that guarantees the correct propagation of writes to SCM.

Persistent Memory Management

Persistent memory can be managed using a file system. User space access to persistent memory can be granted via memory mapping using mmap. The mapping behaves like mmap for traditional files, except that the persistent data is directly mapped to the virtual address space, instead of a DRAM-cached copy.

Figure 3:
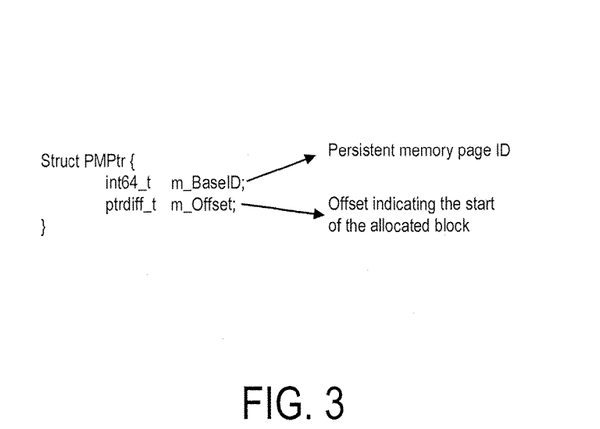
FIG. 3 illustrates an example of a MMTSE persistent memory pointer PMPtr.

When a program crashes, its pointers become invalid since the program gets a new address space when it restarts. This implies that these pointers cannot be used to recover persistent data structures. To solve this problem, a new pointer type can be used, denoted Persistent Memory Pointer (PMPtr). As illustrated in FIG. 3, it consists of a base, which is a persistent memory page ID, and an offset that relates to the start of the allocated block. To manage persistent memory, a persistent memory allocator (PMAllocator) can be used that provides a mapping of persistent memory to virtual memory, which enables the conversion of PMPtrs to regular pointers. "Work pointers" can be regular pointers that are conversions of PMPtrs.

In some implementations, persistent memory can be recovered in the same virtual address space, in which case regular pointers can remain valid. However, the operating system does not guarantee that the previous virtual address segments will remain free.

The PMAllocator uses large persistent memory pages that are cut into smaller segments for allocation. The PMAllocator maps these pages to virtual memory to enable the conversion of PMPtrs to work pointers. At restart time, a new mapping to virtual memory can be created, allowing to re-convert PMPtrs to new valid work pointers. The PMAllocator is also persistent. It maintains a persistent memory page counter to know how many pages it has created. It also stores meta-data at the beginning of every allocated segment. At restart time, the PMAllocator re-opens its persistent memory pages and reconstructs the mapping of its persistent memory to virtual memory.

To perform recovery, a persistent memory entry point can be tracked. One entry point can be sufficient for the whole storage engine since every structure is encapsulated into a larger structure up to the full engine. A persistent entry point can simply be two PMPtrs: the first points to MMTSE's persistent structures and the second to the PMAllocator persistent object. The entry point can be kept in SCM on a small persistent memory page with a fixed ID.

Figure 4:
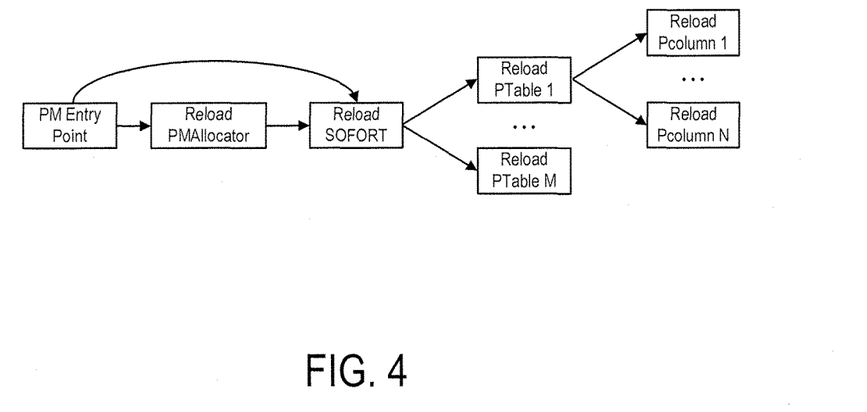
FIG. 4 is a diagram illustrating aspects of a MMTSE recovery diagram.

FIG. 4 shows recovery at restart from a single persistent entry point. Once the PMAllocator has recovered its objects, MMTSE recovers its tables in parallel. Every data structure can include a reload function that checks the sanity of its state, restores work pointers from PMPtrs, and recovers from problematic situations, such as crashing in the middle of a table resize. In every transaction, updating MVCC information is the last operation to perform. Since data structures are append-only, it may not be necessary to do anything since MVCC entries attest the validity and visibility of every row.

The only time consuming operation left is rebuilding the dictionary indexes. They are kept volatile for performance reasons, but can be made persistent on SCM using a persistent map structure, such as the CDDS-Btree. Therefore, recovery time depends on the size of the dictionary indexes. As described below, although dictionary indexes can be rebuilt, MMTSE total recovery time can take only a few seconds.

Figure 11:
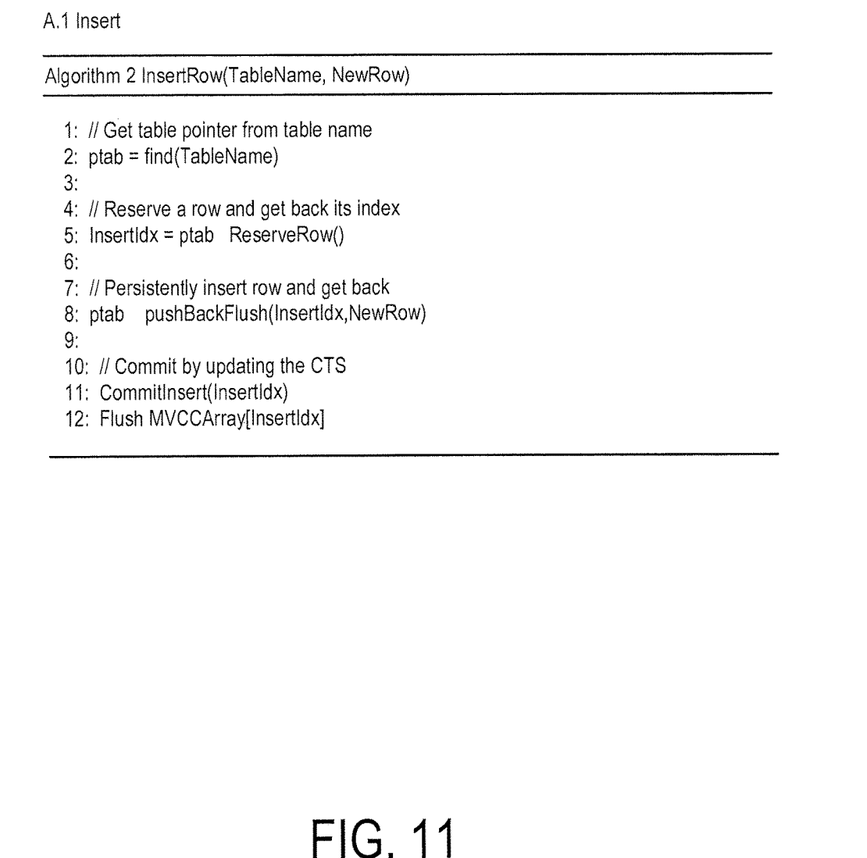
FIG. 11 illustrates an example of an insert row algorithm.
Figure 12:
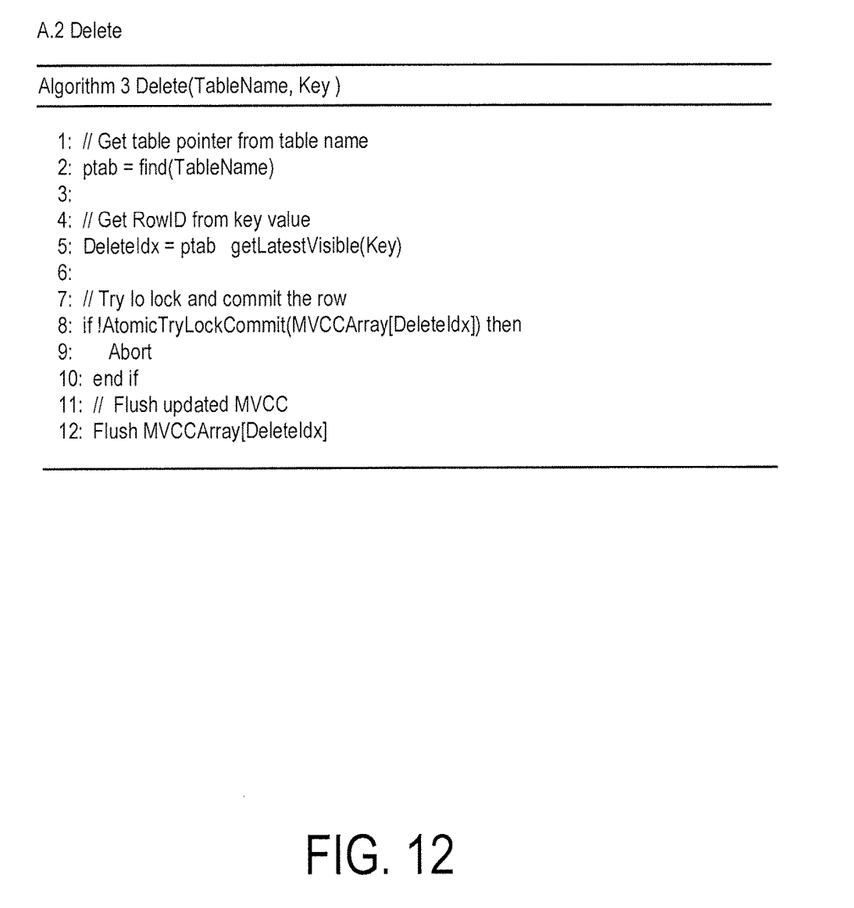
FIG. 12 illustrates an example of a delete algorithm.

Some core operations of MMTSE will now be described, which show how consistency and durability can be achieved. The primary challenge is to make the operations failure atomic: i.e., regardless of crash condition, the database can be recovered to a consistent state. Read operations can be excluded since they do not change the database state and thus, read operations are not a challenge for consistent recovery. Due to space constraints, only the Update operation is discussed. The Insert and the Delete operations are detailed in FIGS. 11 and 12, respectively.

Figure 10:
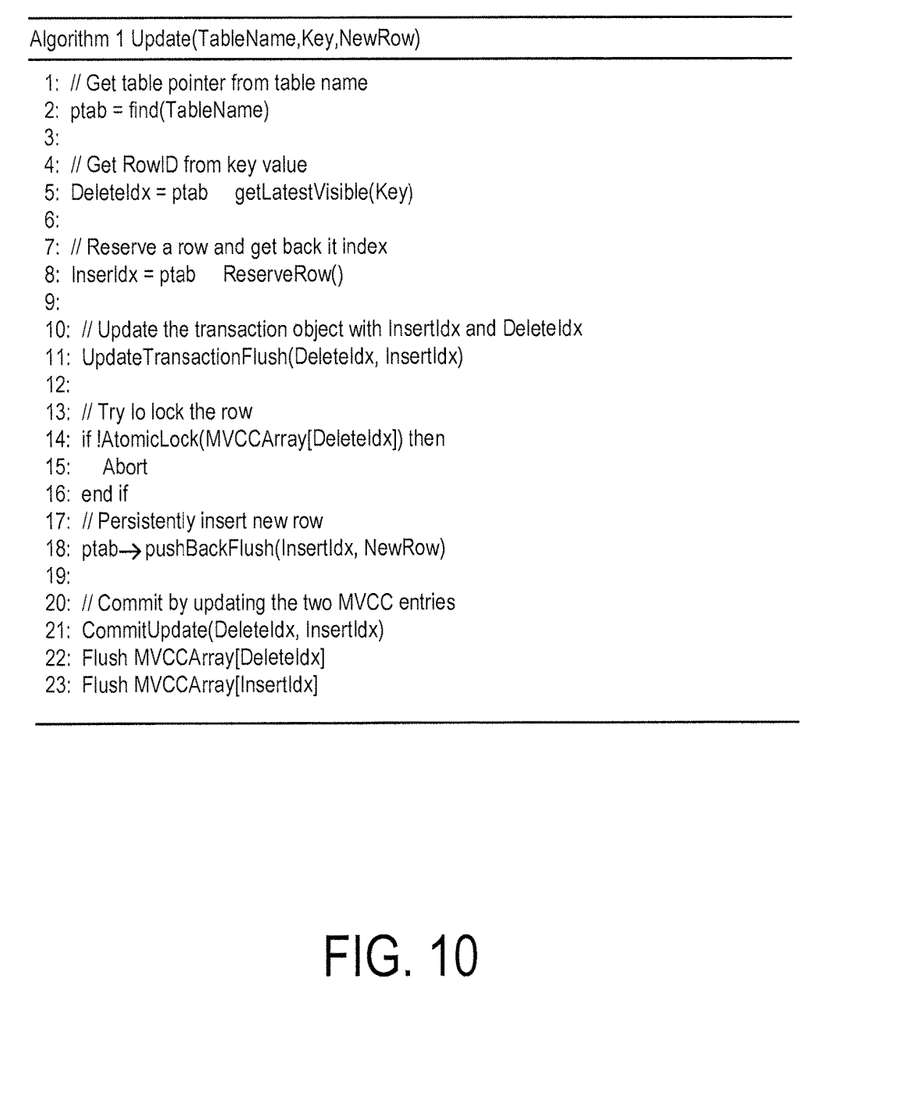
FIG. 10 illustrates an example of an update algorithm.

The update operation can be effectively a Delete operation followed by an Insert operation. Algorithm 1, as shown in FIG. 10, describes the core steps of this operation. First, a pointer can be sent to the target table using a mapping from table names to table IDs (line 2). Then, indexes of the target table are looked up in order to get the latest visible row where the key value (Key) occurs (line 5). Afterwards, a new row can be reserved in the table and receive back the corresponding row index (line 8). If needed, a resize of the table can be triggered. The index of the new row can be computed with an atomic increment of a counter maintained by the table. For example, no other operation will write neither to the row pointed by this index nor to the corresponding MVCC entry.

Thus, the operation can be latch-free and thread-safe. Afterwards, update of the transaction object can be done persistently with the index of the row to be inserted and the index of the row to be deleted (line 11). Then, an atomic compare-and-swap operation can be executed in order to try to lock the row to be deleted by setting its DTS to the transaction ID (line 14) and abort the transaction if the atomic operation fails (line 15). If it succeeds, persistent appending of the row to be inserted to the table (line 18) can be completed. The transaction commits by fetching a commit time-stamp and assigning it to the CTS of the row to be inserted and the DTS of the row to be deleted (21). Finally, persisting the commit by flushing the updated MVCC entries (lines 22-23) can be completed.

The challenging failure scenario can be a crash between lines 22 and 23 in which case the commit might or might not have been propagated to persistent memory. To address this scenario, during recovery, rollback of the update transactions that were active at the time of failure can be completed. To do so, every TRX array entry can be visited and the following can be done for every update transaction: if the CTS of the row to insert and the DTS of the row to delete are valid time-stamps, then nothing is done. Otherwise, reset both the CTS of the row to insert and the DTS of the row to delete to $\infty$. As shown, only update operations need to be rolled back.

Evaluation

In this section, an overview of the system setup is given. Afterwards, MMTSE is evaluated in two steps. First, MMTSE's OLTP performance is evaluated using the TATP benchmark. Second, MMTSE's restart time is evaluated using a micro-benchmark.

System Setup

Figure 5:
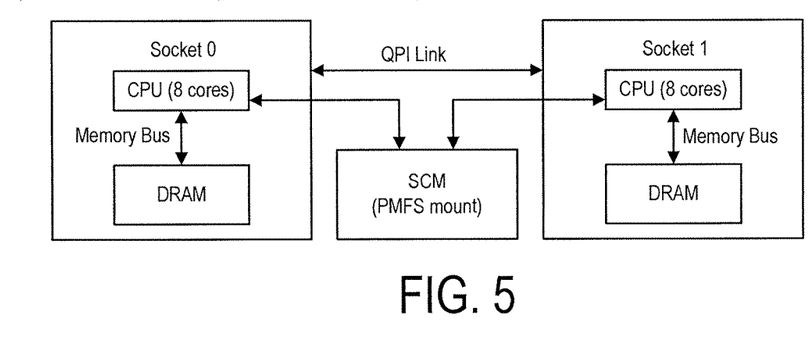
FIG. 5 is a diagram illustrating aspects of a system setup overview.

FIG. 5 gives an overview of the system setup. It can be assumed a hybrid SCM-DRAM environment where both DRAM and SCM can be accessed using load-store semantics. The system can be equipped with a dual socket Intel Xeon E5 processor @ 2.60 GHz, with 20 MB of L3 cache and 8 physical cores per socket. During testing, Intel Hyper-Threading Technology can be disabled.

In order to avoid Non-Uniform Memory Access (NUMA) effects in the performance measurements, the process of the benchmark to run on a single socket can be binded; NUMA effects could be of the same order of magnitude as the higher SCM latencies. The DRAM latency can be measured with Intel Memory Latency Checker as 90 ns. Since different SCM media expose different latencies, multiple SCM latencies can be used during tests.

SCM is managed by Persistent Memory File System (PMFS), a file system optimized for byte-addressable non-volatile memory. Memory mapped PMFS files are not buffered in DRAM. This ensures that applications are given direct access to SCM. In some exemplary implementations, the PMAllocator uses 1 GB PMFS files, each corresponding to a logical memory page.

The hardware can use a custom BIOS to emulate the different higher latencies of SCM. One limitation of this emulation is that the tuned latency can be read-write symmetric, while SCM can have asymmetric read-write latencies, with writes slower than reads.

Throughput

To measure the throughput of MMTSE, the TATP benchmark can be implemented, which is a simple but realistic transactional benchmark that simulates a telecommunication application. It is composed of 80% read transactions and 20% write transactions.

TATP measures Maximum Qualified Throughput, which is the number of successful transactions per second. Two sets of experiments can be run to measure throughput. The first one can be read only and consist of running GetSubData, one of the TATP queries. The second one can be running the full TATP benchmark. In both cases, the number of users from 1 to 16 can vary. The latency of SCM, from 200 ns to 700 ns can also vary. To provide an upper bound of MMTSE's performance, the MMTSE can also be run on shared memory, i.e. on DRAM with a latency of 90 ns. TATP can be run with a scale factor of 100 which corresponds to an initial population of 1M subscribers.

Figure 6:
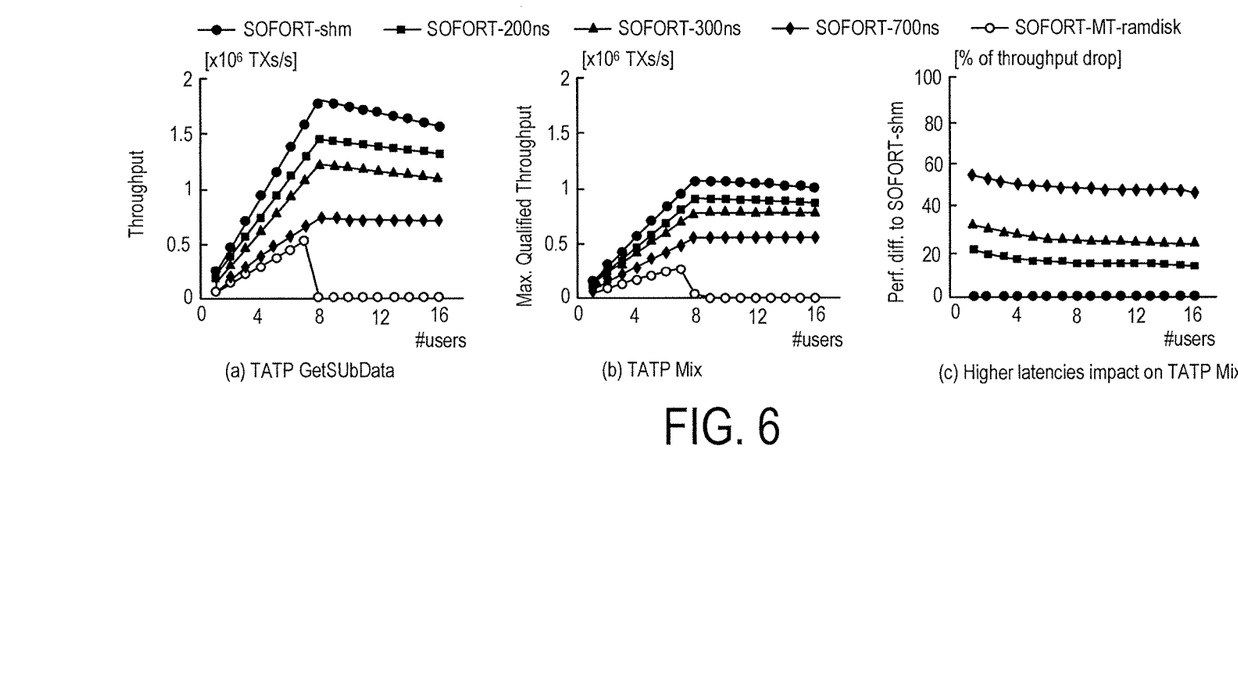
FIG. 6 includes graphs illustrating features relating to MMTSE and Shore-MT.

FIG. 6 illustrates throughput results for some experiments with the techniques and systems described herein. MMTSE on shared memory (MMTSE-shm) can achieve up to 1.8M transaction per second for the read benchmark (FIG. 6*a*), and up to 1.1M transaction per second for the full TATP benchmark (FIG. 6*b*). Even in a high SCM latency environment (700 ns), MMTSE can stay competitive and still outperform Shore-MT on ramdisk. Graph 6 of FIG. 6 highlights the impact of higher SCM latencies on MMTSE's TATP throughput relative to using shared memory.

For a latency of 200 ns, which is more than the double of shared memory latency (90 ns), it can be observed that the performance drop is only approximately 20%. This results from the hybrid design of MMTSE, where structures can be either volatile (hence, faster access) or non-volatile. Additionally, MMTSE resists user contention regardless of SCM latency.

The throughput of Shore-MT on ramdisk drops to almost zero with more than 8 users due to resource contention. However, with Dora, Shore-MT resists to a certain extent user contention.

Recovery

Recovery time can be defined as the time it takes the database to recover and answer a first simple select query. To measure this time, a micro-benchmark can be implemented. The database consists of a single table of 4 integer columns the database size can be changed by varying the number of rows, and the dictionaries size by varying the number of dictionary entries, i.e. the number of distinct values per column. In the following experiments, SCM latency is set to 200 ns.

Figure 7:
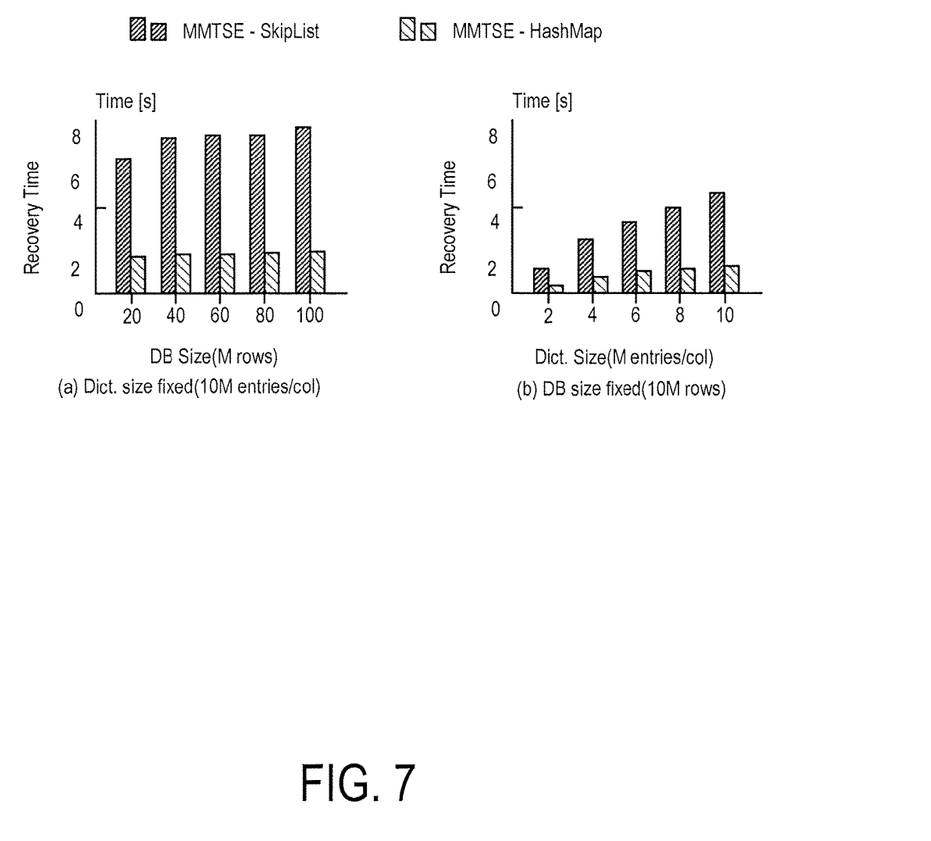
FIG. 7 includes graphs illustrating MMTSE restart time.

Two configurations of MMTSE can be compared. They can differ in the data structure used for the dictionary index. One can use a lock-free skip list map (default configuration) whereas the other one can use the Intel threading building blocks hash map. In graph (b) of FIG. 7, the database size can vary while keeping dictionaries size fixed. In graph (a) of FIG. 7, fixed database size can be kept and vary dictionaries size. An observation can include that MMTSE-HashMap is faster to recover than MMTSE-SkipList. It can also be observed that recovery time increases linearly with the dictionaries size. This can show the cost at recovery time for keeping a volatile structure for dictionary indexes, although it can enable better throughput. The restart time may not depend on the database size for a given dictionaries size.

Figure 9:
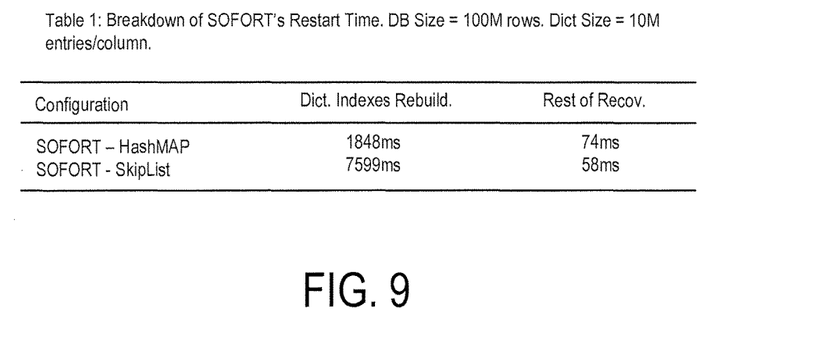
FIG. 9 is a table to represent a breakdown of the restart time into two parts: the time spent in rebuilding the dictionary indexes and the time spent doing the rest of the recovery process.

Table 1 in FIG. 9 represents the breakdown of the restart time into two parts: the time spent in rebuilding the dictionary indexes and the time spent doing the rest of the recovery process. Rebuilding dictionary indexes can largely dominate total restart time.

Figure 8:
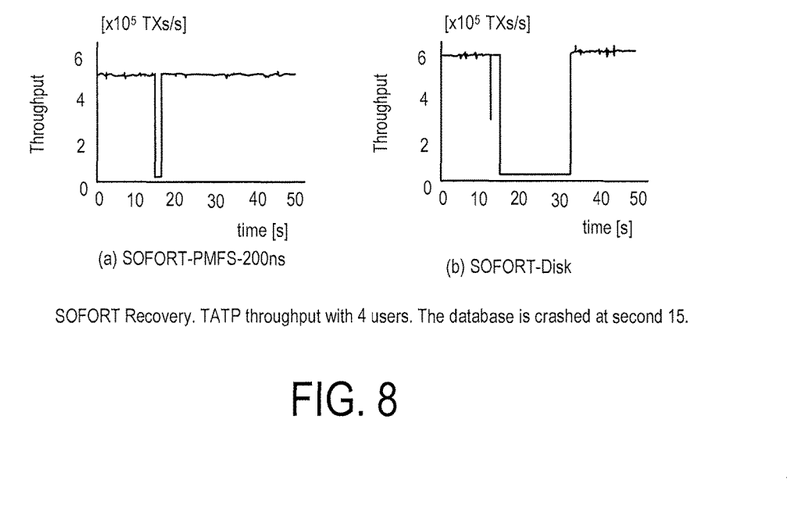
FIG. 8 includes graphs illustrating MMTSE recovery.

To illustrate recovery time, TATP can be run with 4 users on MMTSE and crash the database at second 15, as shown in FIG. 8. To provide a baseline, MMTSE can be implemented on disk using memory mapping. This means that data can be kept on DRAM and backed by files on disk. Since MMTSE on disk is not crash safe, a sync can be called to flush all the dirty memory mapped pages to disk before crashing the system. Graph (a) of FIG. 8 shows MMTSE's throughput on PMFS before, during, and after recovery. MMTSE can recover in approximately 1 second and can deliver right away full throughput performance since it does not need to warm up. Graph (b) of FIG. 8 shows the throughput of MMTSE on disk, where recovery takes approximately 18 seconds, even though MMTSE on disk does not have a real persistence. In conclusion, MMTSE on SCM can offer a good trade-off as it achieves high OLTP throughput performance and recovers from system failures in seconds.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying FIG.s and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

Other implementations may be within the scope of the following claims.

What is claimed is:

1. A data recovery method comprising:
storing primary data of a database in byte-addressable non-volatile random access memory (NVRAM), the primary data comprising one or more persistent tables of data in a byte-addressable, random access memory (RAM) format, the database comprising a persistent memory allocator that maps persistent memory pointers of a persistent memory comprising the NVRAM to virtual memory pointers of a virtual address space associated with the database, and one or more queries operating on the primary data stored in the NVRAM directly without any portion of the primary data being cached in a volatile dynamic random access memory (DRAM);
storing secondary data of the database in the DRAM, the secondary data comprising data structures for assisting an execution of the one or more queries on the primary data of the database, the one or more queries received by a database management system associated with the database; and
in response to a failure of the one or more queries, performing a recovery of the query execution by at least:
recovering, by the database management system, the persistent memory allocator;

mapping, by the persistent memory allocator, the persistent memory to the virtual address space to at least recover, based at least on the persistent memory pointers, the primary data;

translating, by the persistent memory allocator, the persistent memory pointers to virtual memory pointers of a same and/or a different virtual address space for storing restored primary data;

restoring, by the database management system, the primary data by least undoing changes to the primary data made by unfinished transactions of the query execution at the time of failure of one of the one or more queries;

reconstructing, by the database management system, the secondary data based at least on the primary data; and executing, based at least on the restored primary data and the reconstructed secondary data, the unfinished transactions of the query execution, the execution of the unfinished transactions changing the restored primary data.

2. The method in accordance with claim 1, wherein each persistent table of the database comprises one or more persistent columns and a persistent multi-version concurrency control array.

3. The method in accordance with claim 2, wherein the persistent multi-version concurrency control array holds and controls information about currently running transaction objects and includes one or more fencing operations, and wherein each of the one or more fencing operations are configured to provide a consistent image of at least some of the data stored in the one or more persistent tables.

4. The method in accordance with claim 1, further comprising one or more persistent memory pointers, each of the one or more persistent memory pointers comprising a base of a persistent memory page identifier of a persistent memory page, and an offset corresponding to a start of an allocated block of memory of the persistent memory page.

5. The method in accordance with claim 4, further comprising a persistent memory allocator that is configured to map the persistent memory page to a virtual memory.

6. The method in accordance with claim 5, wherein the persistent memory allocator is further configured to convert at least one of the one or more persistent memory pointers to a work pointer.

7. The method in accordance with claim 5, wherein the persistent memory allocator is further configured to:
divide the persistent memory page into a number of segments equal to a size of system pages; and
map each of the segments to a virtual memory page.

8. The method in accordance with claim 1, wherein the secondary data includes one or more dictionary indexes.

9. A system comprising:
a database comprising a database management system, a failure recovery module, a byte-addressable non-volatile random access memory (NVRAM), and a volatile dynamic random access memory (DRAM), the database being configured to at least:
store, in the NVRAM, primary data the primary data comprising one or more persistent tables of data in a byte-addressable, random access memory (RAM) format, the database comprising a persistent memory allocator that maps persistent memory pointers of a persistent memory comprising the NVRAM to virtual memory pointers of a virtual address space associated with the database, the primary data comprising a content of the database, and one or more queries operating on the primary data stored in the NVRAM directly without any portion of the primary data being cached in the DRAM;

store, in the DRAM, secondary data of the database, the secondary data comprising data structures for assisting an execution of of the one or more queries, the one or more queries received by the database management system; and respond to a failure of the one or more queries by at least performing a recovery of the query execution, the recovery comprising:
recovering, by the database management system, the persistent memory allocator;

mapping, by the persistent memory allocator, the persistent memory to the virtual address space to at least recover, based at least on the persistent memory pointers, the primary data;

translating, by the persistent memory allocator, the persistent memory pointers to virtual memory pointers of a same and/or a different virtual address space for storing restored primary data;

restoring, by the database management system, the primary data by least undoing changes to the primary data made by unfinished transactions of the query execution at the time of failure of one of the one or more queries;

reconstructing, by the database management system, the secondary data based at least on the primary data; and executing, based at least on the restored primary data and the reconstructed secondary data, the unfinished transactions of the query execution, the execution of the unfinished transactions changing the restored primary data.

10. The system in accordance with claim 9, wherein each persistent table of the database comprises one or more persistent columns and a persistent multi-version concurrency control array.

11. The system in accordance with claim 10, wherein the persistent multi-version concurrency control array holds and controls information about currently running transaction objects and includes one or more fencing operations, and wherein each of the one or more fencing operations are configured to provide a consistent image of at least some of the data stored in the one or more persistent tables.

12. The system in accordance with claim 9, further comprising one or more persistent memory pointers, each of the one or more persistent memory pointers comprising a base of a persistent memory page identifier of a persistent memory page, and an offset corresponding to a start of an allocated block of memory of the persistent memory page.

13. The method in accordance with claim 12, further comprising a persistent memory allocator that is configured to map the persistent memory page to a virtual memory.

14. The system in accordance with claim 13, wherein the persistent memory allocator is further configured to convert at least one of the one or more persistent memory pointers to a work pointer.

15. The system in accordance with claim 13, wherein the persistent memory allocator is further configured to:
divide the persistent memory page into a number of segments equal to a size of system pages; and
map each of the segments to a virtual memory page.

16. A non-transitory computer storage medium including program code, which when executed by at least one data processor, result in operations comprising:

storing primary data of a database in byte-addressable non-volatile random access memory (NVRAM), the primary data comprising one or more persistent tables of data in a byte-addressable, random access memory (RAM) format, the database comprising a persistent memory allocator that maps persistent memory pointers of a persistent memory comprising the NVRAM to virtual memory pointers of a virtual address space associated with the database, and one or more queries operating on the primary data stored in the NVRAM directly without any portion of the primary data being cached in a volatile dynamic random access memory (DRAM);

storing secondary data of the database in the DRAM, the secondary data comprising data structures for assisting an execution of the one or more queries on the primary data of the database, the one or more queries received by a database management system associated with the database; and in response to a failure of the one or more queries, performing a recovery of the query execution by at least:

recovering, by the database management system, the persistent memory allocator;

mapping, by the persistent memory allocator, the persistent memory to the virtual address space to at least recover, based at least on the persistent memory pointers, the primary data;

translating, by the persistent memory allocator, the persistent memory pointers to virtual memory pointers of a same and/or a different virtual address space for storing restored primary data;

restoring, by the database management system, the primary data by least undoing changes to the primary data made by unfinished transactions of the query execution at the time of failure of one of the one or more queries;

reconstructing, by the database management system, the secondary data based at least on the primary data; and    executing, based at least on the restored primary data and the reconstructed secondary data, the unfinished transactions of the query execution, the execution of the unfinished transactions changing the restored primary data.

* * * * *